United States Patent
Lee et al.

(10) Patent No.: US 7,596,659 B2
(45) Date of Patent: Sep. 29, 2009

(54) METHOD AND SYSTEM FOR BALANCED STRIPING OF OBJECTS

(75) Inventors: Sang Min Lee, Daejeon (KR); Young Kyun Kim, Daejeon (KR); June Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 393 days.

(21) Appl. No.: 11/634,674

(22) Filed: Dec. 6, 2006

(65) Prior Publication Data

US 2007/0174333 A1 Jul. 26, 2007

(30) Foreign Application Priority Data

Dec. 8, 2005 (KR) .................. 10-2005-0119484
Feb. 23, 2006 (KR) .................. 10-2006-0017889

(51) Int. Cl.
*G06F 12/06* (2006.01)
(52) U.S. Cl. .................. 711/114; 711/156; 707/100
(58) Field of Classification Search .................. 707/100, 707/103; 711/145, 156, 170, 114, 112
See application file for complete search history.

(56) References Cited

U.S. PATENT DOCUMENTS

| 6,016,552 | A | 1/2000 | Lee et al. |
| 7,386,663 | B2 * | 6/2008 | Cousins .................. 711/114 |
| 2003/0140051 | A1 * | 7/2003 | Fujiwara et al. ............. 707/100 |
| 2005/0114596 | A1 | 5/2005 | Golding |
| 2005/0160309 | A1 | 7/2005 | Golding |
| 2007/0073985 | A1 * | 3/2007 | Wilkes .................. 711/161 |

FOREIGN PATENT DOCUMENTS

JP 2002-288014 10/2002

* cited by examiner

*Primary Examiner*—Pierre-Michel Bataille
(74) *Attorney, Agent, or Firm*—Ladas & Parry LLP

(57) ABSTRACT

A method of balanced object striping and a system therefor are provided. The object striping method includes: transmitting a data write request and receiving an object identifier if the data write request is a first write request regarding the data; determining a first object storage target to store the data by using the object identifier; and striping the data in a plurality of object storage targets starting from the first object storage target to store the data.

10 Claims, 4 Drawing Sheets

METHOD AND SYSTEM FOR BALANCED STRIPING OF OBJECTS

CROSS-REFERENCE TO RELATED PATENT APPLICATIONS

This application claims the benefit of Korean Patent Application No. 10-2005-0119484, filed on Dec. 8, 2005 and Korean Patent Application No. 10-2006-0017889, filed on Feb. 23, 2006 in the Korean Intellectual Property Office, the disclosures of which are incorporated herein in their entirety by reference.

BACKGROUND OF THE INVENTION

1. Field of the Invention

The present invention relates to a balanced object striping method and system, and more particularly, to a method of a balanced object striping in a redundant array of inexpensive disks (RAID) system by managing data in units of objects, and a system therefor.

2. Description of the Related Art

Ordinary distributed storage can be performed by a striping method in which data is divided into units of a predetermined size, and striped in a plurality of storage devices. In this method, the number of the storage devices across which the data is striped is referred to as a stripe size, and the number of blocks stored in each device is referred to as a stripe element size. In a block redundant array of inexpensive disks (RAID) system, data is stored in predetermined units called blocks, and a logical block address is assigned to each block. According to a stripe size and a stripe element size, a logical block address is converted into a physical block address, and data is stored in a physical storage device.

An object-based storage device stores data in units of objects with arbitrary sizes unlike blocks of an identical predetermined size. Here, the size of one object can be variously defined from bytes to gigabytes. In order to store these objects, conventionally, objects are grouped and a storing method is changed according to the size of objects.

Here, an object is defined as a virtual object and a physical object. The virtual object is an object desired to be stored, and the physical object is an object generated in an object-based storage device in which the virtual object is actually stored. According to a storing method, a virtual object can be stored in one or more physical objects.

When a virtual object is stored, in relation to virtual objects which each have a size smaller than that of a stripe, a storage space corresponding to a stripe should be secured in each storage device regardless of whether or not actual data is stored. Accordingly, an overhead of the storage space may occur. In order to reduce this overhead, according to the conventional technology, if the size of an object desired to be striped is smaller than a stripe element size, the object is stored in physical objects of two storage devices in a mirroring method. If the size of this object later increases to be equal to or larger than a threshold size, the object is bound with another object with a similar size, to form a parity group, and then data and the parity are striped. Here, data migration is required in order to store the object, which is stored through mirroring, in a striping method.

In a data migration process, first, in order to store an object to be newly included in a parity group, a new object is generated in a storage device. If the object is generated, the data of the object is copied into the newly generated object, and with respect to the data included in the parity group, a parity is again calculated. Then, objects of storage devices in which data is previously stored are deleted.

However, when an object is stored through the data migration described above, if the size of each object is smaller than the stripe element size, the objects are concentrated in a first storage device forming stripes. Accordingly, when objects are accessed, input and output requests may be concentrated on a specific disk.

SUMMARY OF THE INVENTION

The present invention provides a method of striping objects, in which an object-based system is utilized and when object storage targets (OSTs) are formed in a redundant array of inexpensive disks (RAID) scheme to stripe objects, objects are made to be striped in different storage devices, by using object identifiers, and thus object concentration and input and output bottlenecks can be reduced, and a system therefor.

According to an aspect of the present invention, there is provided an object striping method including: transmitting a data write request and receiving an object identifier if the data write request is a first write request regarding the data; determining a first object storage target to store the data by using the object identifier; and striping the data in a plurality of object storage targets starting from the first object storage target to store the data.

According to another aspect of the present invention, there is provided an object striping system including: at least one file sever arranged to transmit a data write request; a plurality of object storage targets arranged to generate objects having an identical object identifier according to a received object generation command in order to store data; and a metadata server arranged to transfer an object generation command including the object identifier to the plurality of object storage targets according to the data write request, wherein the at least one file server stripes the data in the plurality of object storage targets using the object identifier.

According to another aspect of the present invention, there is provided an object striping system for striping data, including a plurality of object storage targets arranged to form a stripe in order to stripe the data, wherein each of the plurality of object storage targets generates an object having an identical object identifier, and the data is striped in the objects.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
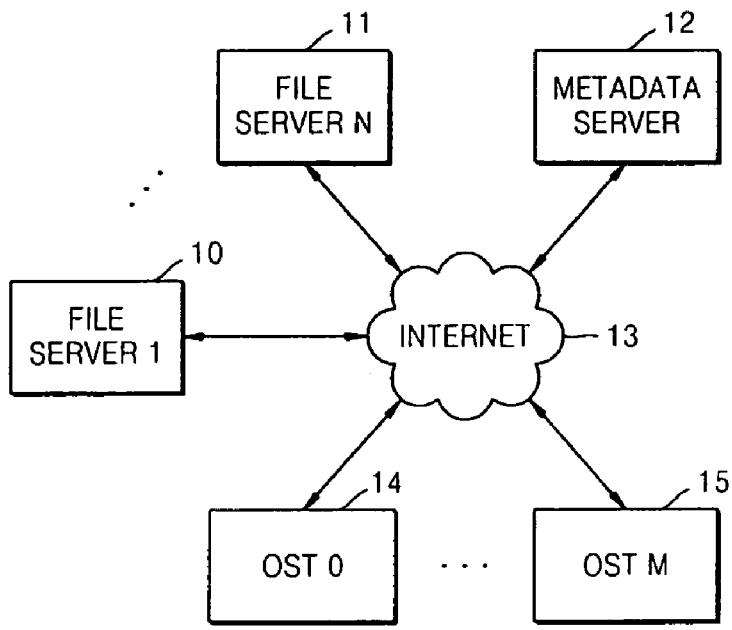
FIG. 1 is a schematic diagram illustrating a configuration of an object striping system according to an embodiment of the present invention.

FIG. 1 is a schematic diagram illustrating a structure of an object striping system according to an embodiment of the present invention.

The object striping system includes first through Nth file servers 10 and 11, a metadata server 12, $0^{th}$ through $M^{th}$ OST 14 and 15 that are connected to file servers 1 and 10 and the metadata server 12 through a network 13, such as the Internet.

In the first through Nth file servers 10 and 11, all data forms exist as virtual objects, and data is stored as physical objects in the $0^{th}$ through $M^{th}$ OST 14 and 15.

The $0^{th}$ through $M^{th}$ OST 14 and 15 are storage servers storing data received through the network 13, in the object format. The physical device configuration of the storage server or which form the storage server stores the objects in is determined inside the storage server and is beyond the scope of the present invention. Accordingly detailed explanation on them will be omitted.

In the current embodiment, physical objects of OSTs 14 and 15 striping one virtual object are defined to have an identical identifier. Also, in relation to one virtual object, each OST defines one physical object and accesses the object by using the identifier of the object.

If a request for storing data from at least one of the first through Nth file servers 10 and 11 is received, the metadata server 12 stripes the data across the $0^{th}$ through $M^{th}$ OST 14 and 15 through the network 13.

Figure 2A:
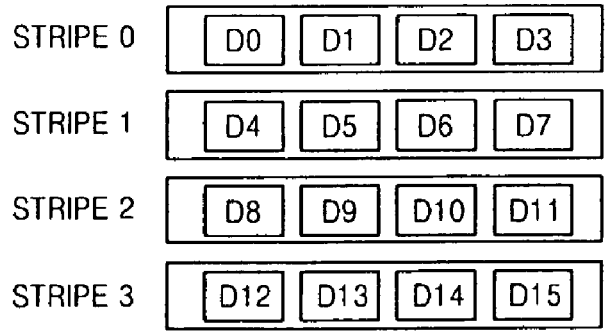
FIG. 2A illustrates a data block structure for a block redundant array of inexpensive disks (RAID) system.

FIG. 2A illustrates a data block structure for RAID system. D0 through D15 are data blocks which each have a stripe element size, four stripe elements form one stripe.

Figure 2B:
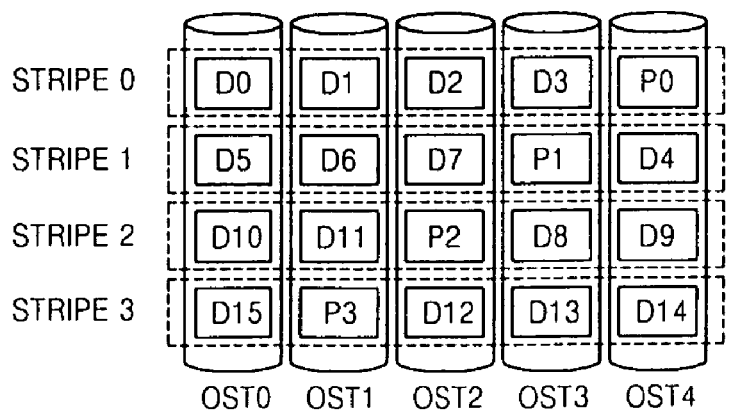
FIG. 2B illustrates a structure in which data with the structure illustrated in FIG. 2A is striped in a plurality of object-based storage targets (OSTs).

FIG. 2B illustrates a structure in which data with the structure illustrated in FIG. 2A is striped in a plurality of object-based storage targets. The structure illustrated in FIG. 2B is a left-symmetric block layout in which parity blocks are positioned in the slant line beginning from the right to the left of OST 0 through OST 4.

Here, P0 through P3 are parity blocks for respective stripe units. D0, D1, D2, D3, and P0 forming one stripe are stored in an identical disk block address of respective object-based storage targets, OST 0 through OST 4. In a logical disk, data and parity blocks have logical block addresses and when these are physically stored on physical disks, the logical block addresses are converted into physical block addresses and then the blocks are stored.

Figure 3:
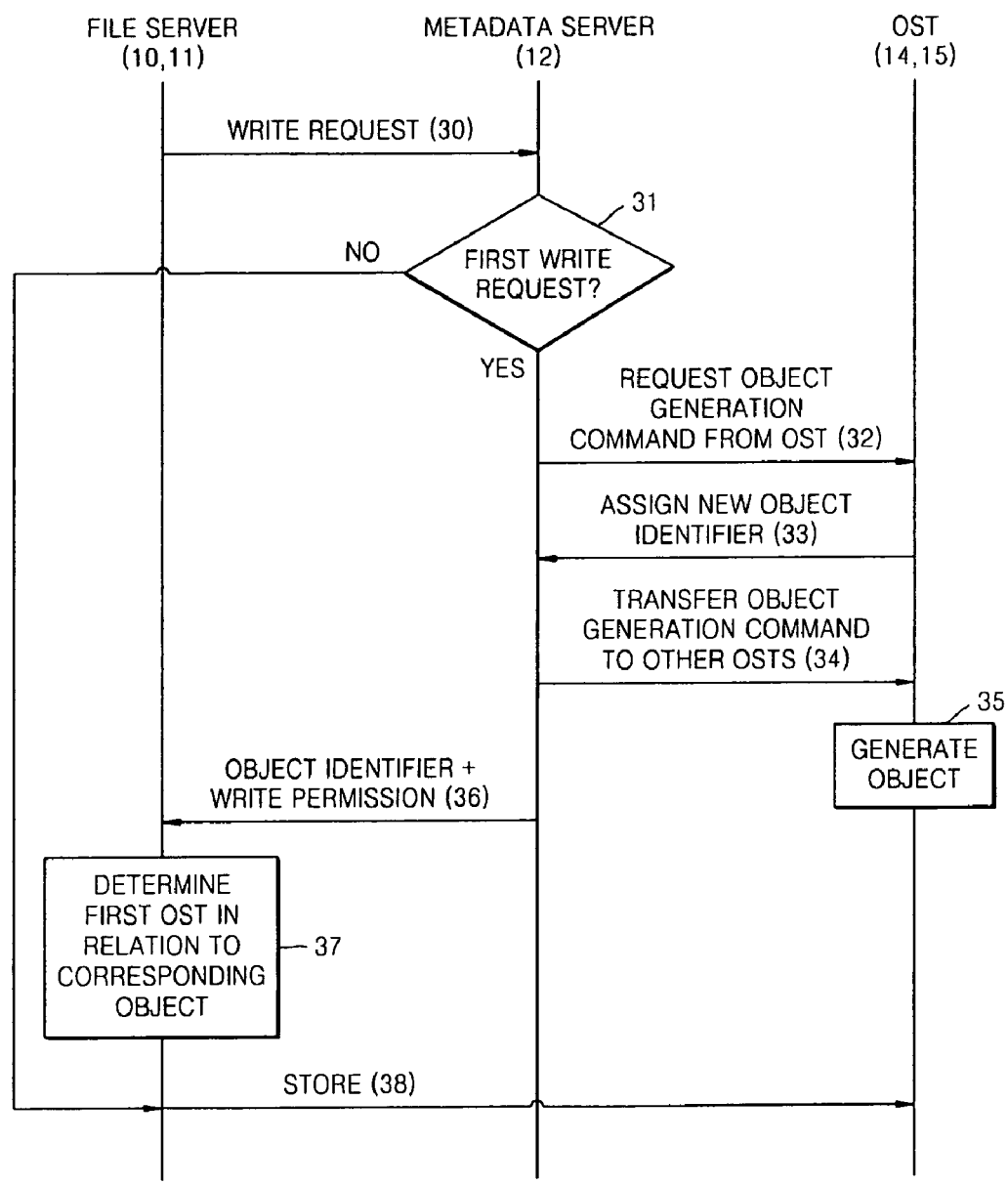
FIG. 3 is a flowchart illustrating a method of striping objects according to an embodiment of the present invention.

FIG. 3 is a flowchart illustrating a method of striping objects based on the object striping storage system illustrated in FIG. 1.

If a request for writing data from one of the first through Nth file servers 10 and 11 is received in operation 30, the metadata server 12 determines whether or not the received request for writing data is a first write request for the corresponding data in operation 31.

If the request is the first write request, the metadata server 12 requests an object generation command to the $0^{th}$ OST 14 forming a stripe in operation 32. Here, an object identifier field included in the object generation command is set to '0' so that the field indicates the request is the first one. Since the object identifier field is set to '0', the $0^{th}$ OST 14 assigns a new object identifier to inform the new object identifier to the metadata server 12 in operation 33.

The assignment of a new object identifier according to the current embodiment is performed as follows. According to an object command standard, it is defined that one object-based storage device assigns values from a predetermined one, e.g., from 65536 to object identifiers. Here, it is defined that whenever an object is generated, the object identifier increases by 1, and once an object identifier is used, the object identifier is not reused after the corresponding object is deleted. Accordingly, the object identifier is guaranteed its uniqueness in the corresponding object RAID system.

The metadata server 12 transfers an object generation command including the newly assigned object identifier, to other OSTs, i.e., the first OST through Mth OST 15 in operation 34.

Each OST 14 and 15 generates an identical object in operation 35. The metadata server 12 transmits the object identifier and a write permission to a file server which requests a data write in operation 30. The corresponding file server determines a first OST in relation to each object. The determination of the first OST in relation to each object can be performed as follows. First, a first object identifier, e.g., 65536, assigned to each OST, is subtracted from the object identifier of an object. The subtraction result is divided by the number of OSTs forming a stripe. The remainder of the division is a relative value with which a first OST for the object can be determined. The first OST to be determined using this relative value varies according to an object storing scheme. For example, if the storing scheme is the left-symmetrical one described above and if the relative value is 3, the first OST position at which the object is stored is OST 3 located at the third on the right from OST 0. If the first OST at which the object is to be stored is determined, the corresponding file server stripes the data and parity from the first OST in operation 38. Here, the stripe element size may be determined to be a predetermined byte size with reference to the object access characteristics. If the request is not the first write request in operation 31, the data and parity are striped in corresponding OSTs by using the object identifier.

Figure 4A:
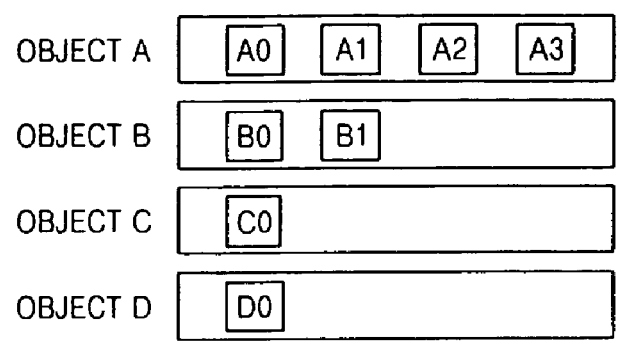
FIG. 4A illustrates an exemplified configuration of objects.
Figure 4B:
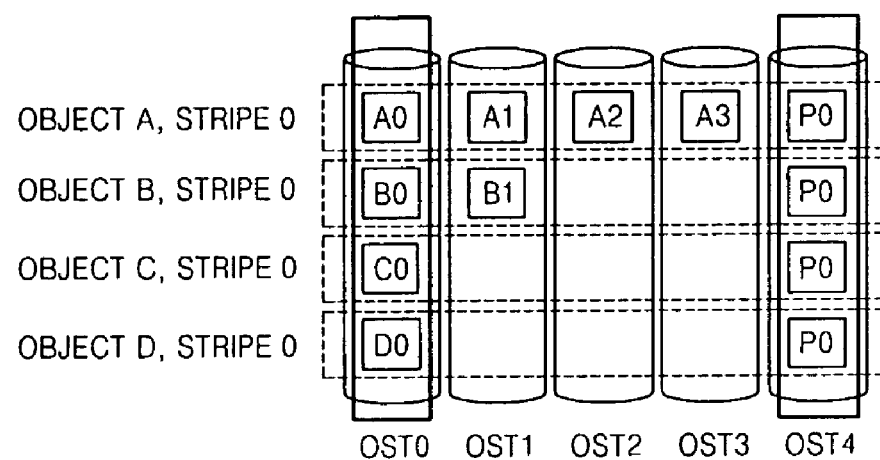
FIG. 4B illustrates a result of object striping in each object storage target according to conventional technology.

FIG. 4A illustrates an exemplified configuration of objects, and FIG. 4B illustrates a result of object striping in each object storage target (OST) according to conventional technology In general, in a block RAID system, data is stored in a logical disk at a position corresponding to a logical address, and a storage device in which the data is stored physically and a physical disk block are determined by dividing the entire logical disk by the stripe size. Unlike this, in an object RAID system, an object is stored based on a logical byte address in units of packets. That is, in a single object, data is stored in a logical address area from offset 0 to offset (an object size −1). Accordingly, when data is stored in object OSTs, an actual OST and the storage position at the physical object are determined by dividing this offset by a stripe size.

However, as illustrated in FIG. 4B, it can be seen that the first stripe of each object begins at OST 0. If sizes of many objects are smaller than a stripe element size, data may be concentrated on and stored in a predetermined OST, i.e., OST 0. If parities are also defined, the parities may also be concentrated on and stored in a predetermined OST, i.e., OST 4. Accordingly, the more frequently the objects are accessed, the more likely a bottleneck will develop. In the worst case, if the size of all objects is smaller than a stripe element size, the data and parities of all objects are stored only in a predetermined OST and thus the stored structure becomes similar to that of the mirroring scheme. However, unlike the mirroring scheme, the remaining OST areas can never be used and then be wasted.

Figure 5A:
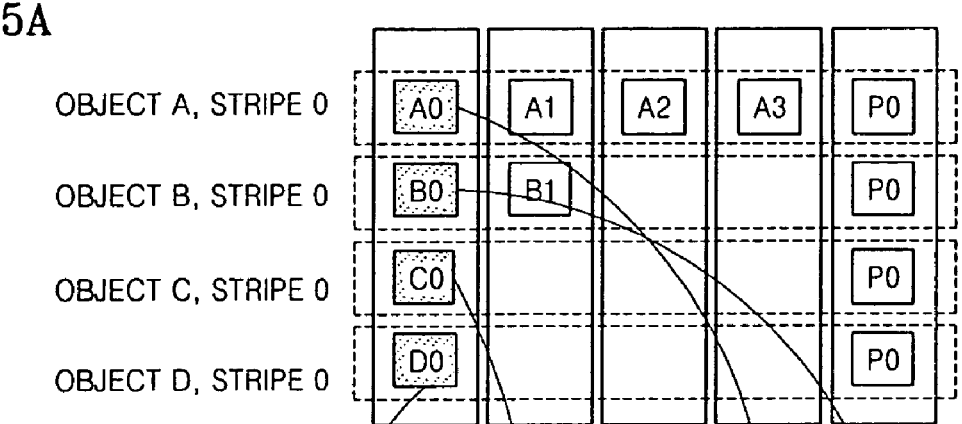
FIG. 5A illustrates a result of striping objects according to the conventional technology and FIG. 5B illustrates a result of striping objects according to an embodiment of the present invention.
Figure 5B:
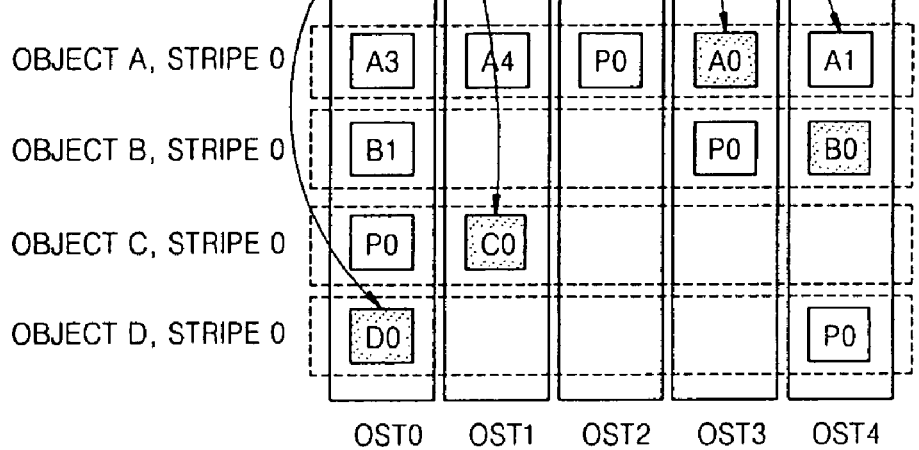

FIG. 5A illustrates a result of striping objects according to the conventional technology and FIG. 5B illustrates a result of striping objects according to an embodiment of the present invention. FIG. 5B illustrates a structure according to a left-symmetric storing scheme.

Referring to FIG. 5B, the first OST of each object is determined according to an object identifier, and according to the determined first OST, the remaining data and parity are stored in the left-symmetric scheme. Accordingly, data of each object is striped in different OSTs and parities are also striped in different OSTs according to the object striping method. According, the likelihood of a bottleneck in which object access commands are concentrated on a predetermined disk can be reduced and even when a large number of objects are accessed, the objects can be accessed in parallel.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the present invention, a first OST is determined using an object identifier, and from the determined first OST, data and parities are striped according to the object striping method. In this way, concentration of data and parities on a predetermined disk can be prevented. Also, even when an object size is smaller than a stripe element size, data and parities are striped better compared with the conventional technology and thus bottlenecks in which object access commands are concentrated on a predetermined disk can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An object striping system comprising:
    at least one file sever arranged to transmit a data write request;
    a plurality of object storage targets arranged to generate objects having an identical object identifier according to a received object generation command in order to store data; and
    a metadata server arranged to transfer an object generation command including the object identifier to the plurality of object storage targets according to the data write request,
    wherein the at least one file server stripes the data in the plurality of object storage targets using the object identifier, and
    wherein the at least one file server determines a first storage target to start to store the data by subtracting a predetermined value from the object identifier, obtains a remainder by dividing the subtraction result by a number of the object storage targets, and moves as many times as the remainder from a first positioned object storage target.

2. The system of claim 1, wherein if the data write request is a first write request for the data, the metadata server transmits an object generation command request including a value which indicates the data write request is the first write request to a predetermined initial object storage target.

3. The system of claim 2, wherein in response to the object generation command request, the metadata server is assigned the object identifier by the predetermined initial object storage target, and transfers the object identifier to the at least one file server.

4. An object striping system for striping data, comprising:
    a plurality of object storage targets arranged to form a stripe in order to stripe the data, wherein each of the plurality of object storage targets generates an object having an identical object identifier, and the data is striped in the objects, and
    wherein a first object storage target for the data is determined by subtracting a predetermined value from an object identifier, obtaining a remainder by dividing the subtraction result by a number of the object storage targets, and moving as many times as the remainder from the first positioned object storage target.

5. The system of claim 4, wherein the data is striped by determining other object storage targets to be accessed using the offset of the object.

6. An object striping method comprising:
    transmitting a data write request and receiving an object identifier if the data write request is a first write request regarding the data;
    determining a first object storage target to store the data by using the object identifier; and
    striping the data in a plurality of object storage targets starting from the first object storage target to store the data,
    wherein the first object storage target is determined by subtracting a predetermined value from the object identifier, obtaining a remainder by dividing the subtraction result by a number of the object storage targets, and moving as many times as the remainder from the first positioned object storage target.

7. The method of claim 6, wherein the receiving of the object identifier comprises:
    in response to the data write request, a meta data server transmitting an object generation command request including a value which indicates the data write request is the first write request to a predetermined initial object storage target of the plurality of object storage targets; and
    in response to the object generation command request, the metadata server being assigned the object identifier by the predetermined initial object storage target.

8. The method of claim 7, wherein before the striping of the data, each of the remaining object storage targets, except the predetermined initial object storage target receives the object generation command including the object identifier and generates an object for storing the data.

9. The method of claim 8, wherein the objects generated in the plurality of object storage targets have an identical object identifier.

10. The method of claim 6, wherein the determining of the first object storage target for storing the data further comprises each of the plurality of object storage targets generating an object for storing the data.

* * * * *